(12) United States Patent
Wallace et al.

(10) Patent No.: US 6,178,178 B1
(45) Date of Patent: Jan. 23, 2001

(54) SWITCHING MODULE FOR REDUNDANT LOCAL AREA NETWORK

(75) Inventors: Raymond Bruce Wallace, Kanata; Alexandra Michelle Dopplinger; David Longbottom, both of Ottawa, all of (CA)

(73) Assignee: Nortel Networks Limited, Montreal (CA)

( * ) Notice: Under 35 U.S.C. 154(b), the term of this patent shall be extended for 0 days.

(21) Appl. No.: 09/066,023

(22) Filed: Apr. 24, 1998

Related U.S. Application Data

(63) Continuation of application No. 08/251,990, filed on Jun. 1, 1994, now abandoned.

(51) Int. Cl.[7] ........................................................ H04J 3/16
(52) U.S. Cl. ............................................................. 370/465
(58) Field of Search ............................... 370/465, 445, 370/254, 216, 217, 278, 221, 222, 223, 224, 225, 226, 227, 228, 400, 401, 351, 352; 379/221; 340/825.01, 825.5, 827

(56) References Cited

U.S. PATENT DOCUMENTS

| 5,200,949 | * | 4/1993 | Kobayashi | 370/245 |
| 5,410,535 | * | 4/1995 | Yang et al. | 370/254 |

* cited by examiner

*Primary Examiner*—Dang Ton
(74) *Attorney, Agent, or Firm*—Dallas F. Smith

(57) ABSTRACT

A switching module provides connection of a processor to a redundant local area network. Redundant access units switch control selects the access unit used by the processor based on the status of each local area network. In particular, two 10BaseT Ethernet LANs are monitored by scanning for respective link beats or data.

9 Claims, 3 Drawing Sheets

SWITCHING MODULE FOR REDUNDANT LOCAL AREA NETWORK

This is a continuation of prior applicaiton Ser. No. 08/251,990 filed Jun. 1, 1994 in the name of Raymond Bruce Wallace entitled "SWITCHING MODULE FOR REDUNDANT LOCAL AREA NETWORK", now abandoned.

This invention relates to an interface module for a local area network (LAN) and is particularly concerned with modules providing switching between primary and secondary LANs.

BACKGROUND OF THE INVENTION

Local area networks or LANs are a well know means to interconnect processors to share resources such as file servers and printers and to communicate with other processors. One such LAN is the 10BaseT Ethernet, an IEEE standard, which runs over twisted pair cable. To improve reliability it is known to use a second or so-called redundant LAN to provide communications in the event of a failure of the primary LAN. The use of a second LAN requires duplication of LAN interface equipment and LAN addressing.

SUMMARY OF THE INVENTION

An object of the present invention is to provide an improved interface module for a local area network.

In accordance with an aspect of the present invention there is provided a switching module for interfacing to a local area network comprising: means for connecting the switching module to a pair of links forming a redundant local area network; first access means for coupling a processor to one of the links connected to the means for connection; second access means for coupling a processor to the other of the links connected to the means for connection; means for connecting the switching module to a processor; and switching means for selecting one of the access means to effect connection of the processor to one of the links.

In accordance with another aspect of the present invention there is provided a [another independent claim]

In accordance with the present invention the switching module monitors the primary link for the presence of a link beat signal as provided by the 10BaseT standard and automatically switches to a secondary LAN connection when the primary link fails as indicated by the absence of the link beat signal.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
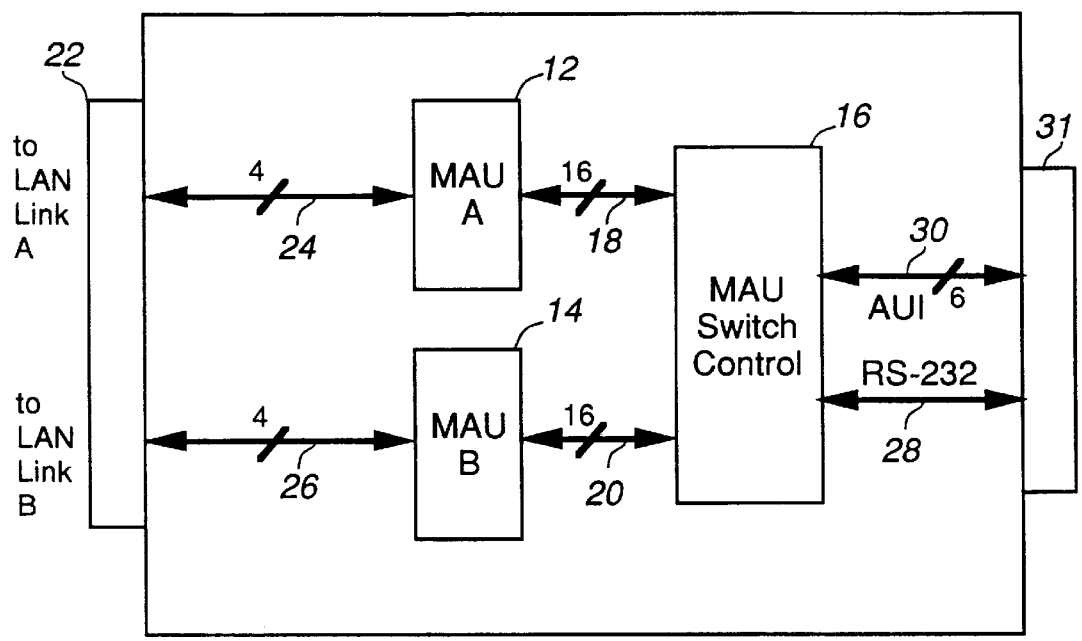
FIG. 1 illustrates, in a block diagram, a switching module for interfacing a local area network in accordance with an embodiment of the present invention.

Referring to FIG. 1, there is illustrated a switching module for interfacing a local area network in accordance with an embodiment of the present invention. The interface module 10 comprises first and second media access units MAU A 12 and MAU B 14 connected to a MAU switch control 16 via lines 18 and 20, respectively. The MAU A 12 and MAU B 14 are connected to a LAN connector 22 via lines 24 and 26, respectively. The MAU switch control 16 is connected to a service processor (not shown in FIG. 1) via an RS-232 control line 28, an attachment unit interface (AUI) line 30 and a connector 31. The connector 31 provides both an RS-232 port for the RS-232 control line 28 and an AUI port for the AUI line 30.

The redundant pair of 10BaseT MAUs, MAU A 12 and MAU B 14, each provides the necessary electrical and functional interface between the IEEE 802.3 standard Attachment Interface Unit (AUI) and the LAN unshielded twisted pair Ethernet cable.

Figure 2:
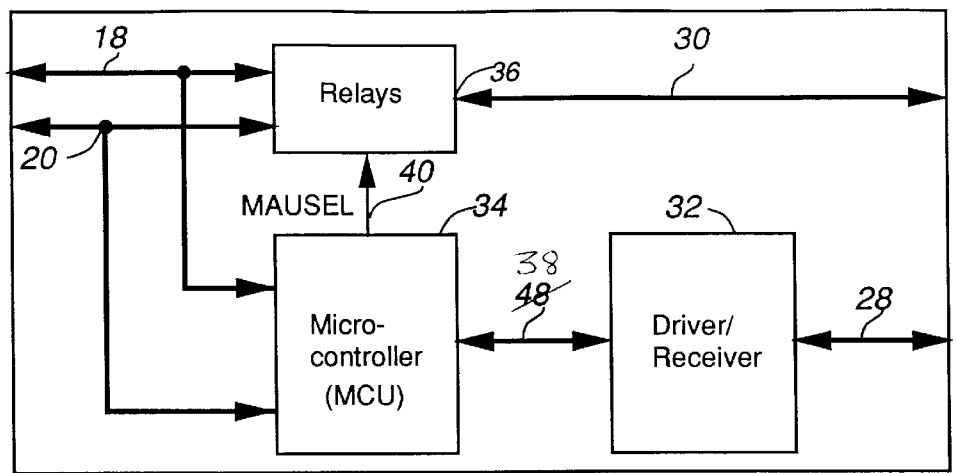
FIG. 2 illustrates, in a block diagram, the media access unit (MAU) switch control of FIG. 1.

Referring to FIG. 2, there is illustrated, in a functional block diagram the MAU switch control 16 of FIG. 1. The MAU switch control 16 includes a driver/receiver 32, a microcontroller (MCU) 34, and relays 36. The driver/receiver 32 is connected to the MCU 34 via a serial line 38. The AUI line 30 is connected to relays 36. A control line 40, labeled MAUSEL is connected from the MCU 34 to relays 36. Lines 18 and 20 and connected to relays 36 and MCU 34.

Figure 3:
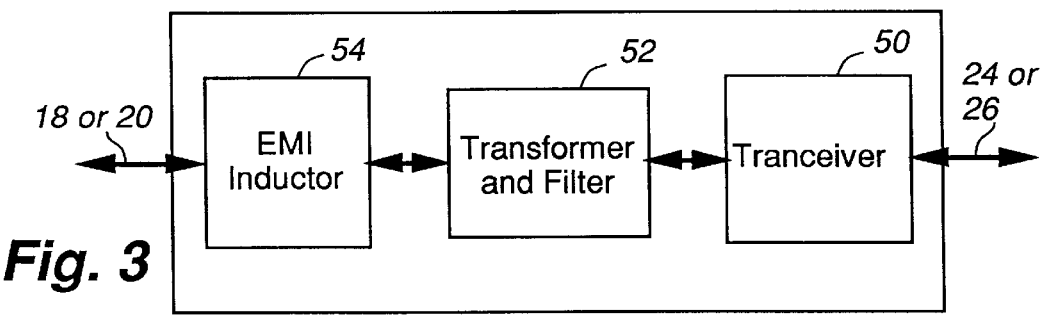
FIG. 3 illustrates the MAU of FIG. 1.

Referring to FIG. 3, there is illustrated, in a block diagram, the media access unit (MAU) of FIG. 1. The MAU includes a transceiver (TPEX) 50, a transformer and filter 52 and an EMI inductor 54.

The TPEX 50 provides the twisted pair driver and receiver circuits. In a particular embodiment, the transceiver is an AM79C98 twisted pair ethernet transceiver (TPEX) by Advanced Micro Devices. The TPEX 50 identifies a link as being functional if either data packets or link beat pulses are present. LNKBTA and LNKBTB are driven to a logic low level when the links are functional. However, when a link is nonfunctional, the output pins are internally pulled high. The transformer and filter 52 provide impedance matching, EMI filtering and equipment isolation protection. The EMI inductor 54 provides common and differential mode noise filtering and high current and voltage isolation.

Figure 4:
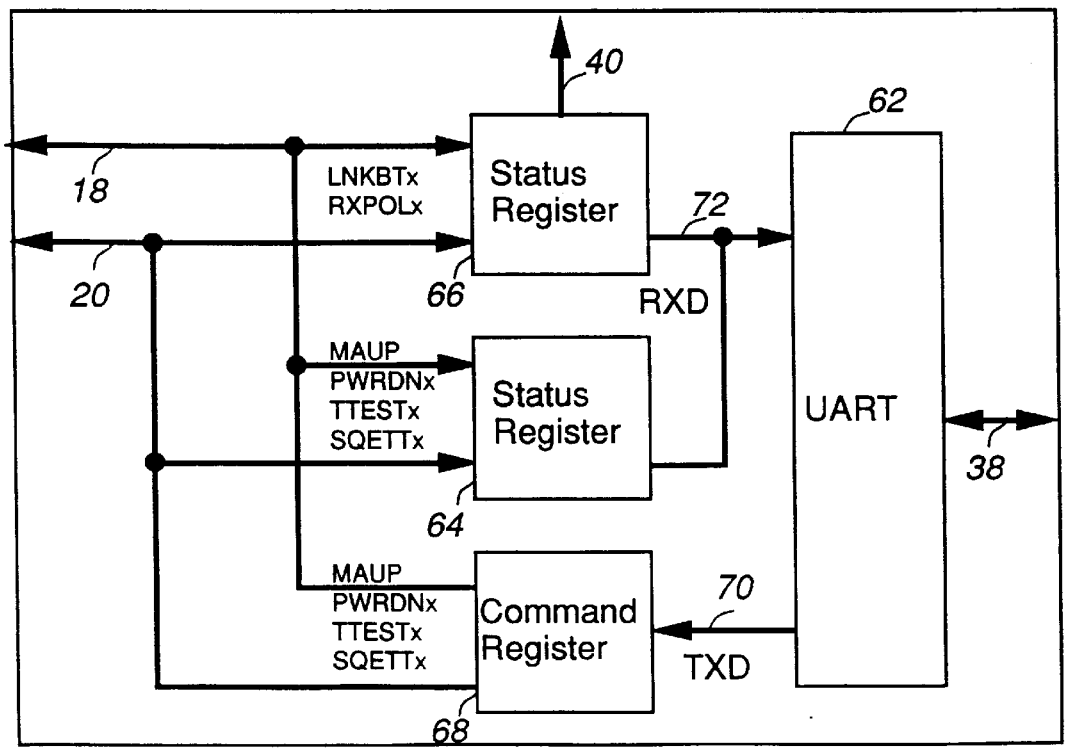
FIG. 4 illustrates in a logic block diagram the logical firmware groupings within the microcontroller (MCU) in the MAU switch control of FIG. 2.

Referring to FIG. 4, there is illustrated, in a logical block diagram, the logical firmware groupings within the microcontroller (MCU) 34 in the MAU switch control 16 of FIG. 2. The MCU 34 includes a UART 62 and three 8-bit registers, two status registers 64 and 66, and one control register 68. The status register 64 holds bits 0 through 7 indicating the state of the command register bits and corresponding to: MAUP, PWRDNA, PWRDNB, TTESTA, TTESTB, SQETTA, SQETTB, and 0. The status register 66 holds bits 0 through 7 indicating the state of the MAU units and corresponding to: MAUSEL, LNKBTA, LNKBTB, 0, RXPOLA, RXPOLB, 0, and 0. The serial line 38 links the UART 62 with the service processor. The UART 62 is connected to the command register 68 via a transmit line 70. Status registers 64 and 66 are connected to the UART 62 via a receive line 72. The MAUSEL bit line 40 provides the MAUSEL bit of status register 66. The service processor can poll the status registers at any time via the serial line 38 and UART 62.

The command register 68 holds bits 0 through 7 corresponding to: MAUP, PWRDNA, PWRDNB, TTESTA, TTESTB, SQETTA, SQETTB, and COMMAND. The service processor can send a command byte to the interface module 10 at any time via the RS-232 line 28, the serial line 38 and UART 62. If the COMMAND bit is set at logic high the contents of the command register are overwritten by the command byte. If the COMMAND bit is set at logic low, indicating a status poll, the contents of the command register are not changed. The interface module 10 responds with a message containing the updated status of the status register. The significance of the bits in the status and command register is described in greater detail hereinbelow in conjunction with FIG. 5.

Figure 5:
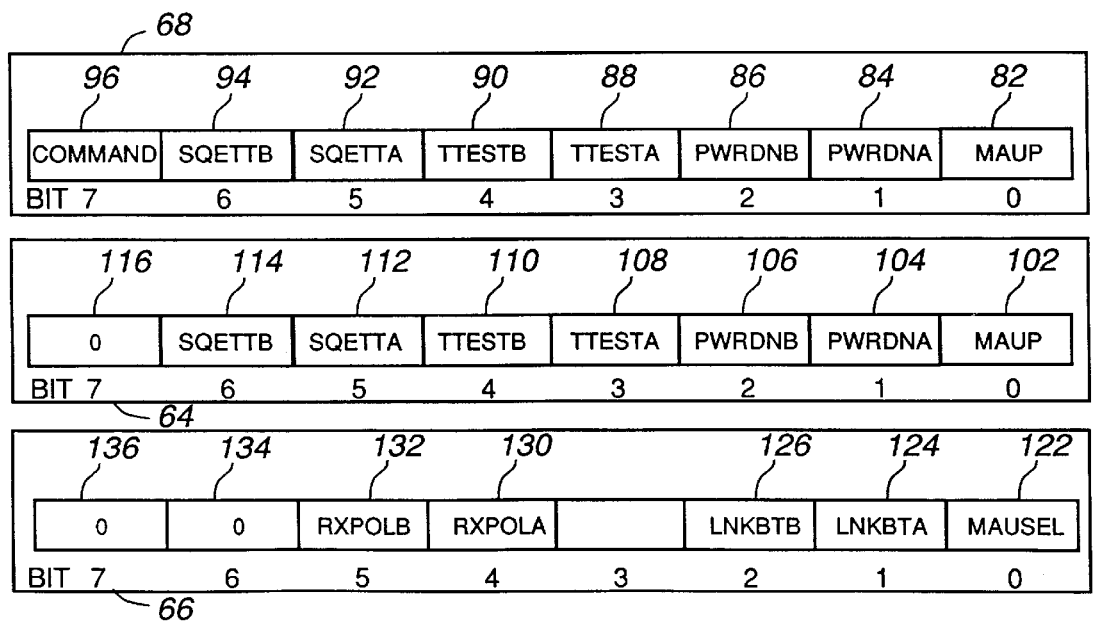
FIG. 5 illustrates the control and status registers of the MAU switch controller of FIG. 2.

Referring to FIG. 5, there is illustrated the status and control registers of the microcontroller (MCU) 34 of FIG. 4. The command register 68 holds the bits: bit 0, MAUP 82; bit 1, PWRDNA 84; bit 2, PWRDNB 86; bit 3, TTESTA 88; bit 4, TTESTB 90; bit 5, SQETTA 92; bit 6, SQETTB bit 94; and bit 7, COMMAND bit 96. The most significant bit is the bit 7 COMMAND 96. The value of the COMMAND bit 96 indicates the following:

| | | |
|---|---|---|
| COMMAND = 0 | | a status poll only, ignore bits 0–6 inclusive, |
| COMMAND = 1 | | a command to alter bits 0–6 inclusive to the value written, and |
| the remaining bits have the following meaning: | | |
| MAUP = 0 | | Select MAU A as the primary MAU; |
| MAUP = 1 | | Select MAU B as the primary MAU; |
| PWRDNA = 0 | | Power up MAU A; |
| PWRDNA = | 1 | Power down MAU A; |
| PWRDNB = 0 | | Power up MAU B; |
| PWRDNB = 1 | | Power down MAU B. |
| TTESTA | SQETTA | Function |
| 0 | 0 | Enable MAU A link beat |
| 0 | 1 | Disable MAU A link beat |
| 1 | 0 | MAU A test mode: station |
| 1 | 1 | MAU A test mode: repeater |
| TTESTB | SQETTB | Function |
| 0 | 0 | Enable MAU B link beat |
| 0 | 1 | Disable MAU B link beat |
| 1 | 0 | MAU B test mode: station |
| 1 | 1 | MAU B test mode: repeater |

The status register 64 holds bits indicating the state of the command register bits: bit 0, MAUP 102; bit 1, PWRDNA 104; bit 2, PWRDNB 106; bit 3, TTESTA 108; bit 4, TTESTB 110; bit 5, SQETTA 112; bit 6, SQETTB 114; and bit 7, which has a value of 0 in the status register 116.

The status register 66 holds bits indicating the state of the MAU units with bit 0, MAUSEL 122; bit 1, LNKBTA 124; bit 2, LNKBTB 126; bit 4, RXPOLA 130; bit 5, RXPOLB 132; bit 6, which has a value of 0 in the status register 134; and bit 7, which has a value of 0 in the status register 136, with meanings as follow:

| | |
|---|---|
| MAUSEL = 0 | MAU A is the active MAU, |
| 1 | MAU B is the active MAU; |
| LNKBTA = 0 | LINK A link beat is present, |
| 1 | LINK A link beat is absent; |
| LNKBTB = 0 | LINK B link beat is present, |
| 1 | LINK B link beat is absent; |
| RXPOLA = 0 | LINK A polarity is OK, |
| 1 | LINK A polarity is reversed; |
| RXPOLB = 0 | LINK B polarity is OK, |
| 1 | LINK B polarity is reyersed; |

In operation, the service processor can only write to the command register 68 via UART 62 and transmit line 70 and read from the status registers 64 and 66 via receive line 72 and UART 62.

Messages are transmitted at 9600 baud with one stop bit and no parity. A valid message from the service processor interface module consists of three bytes as follows:

| | |
|---|---|
| Service Processor sends: | STX [Control Byte] ETX (three bytes) |
| where: | STX is ASCII character 02. ETX is ASCII character 03. |

The interface module 10 echoes each of the three bytes back to the service processor. Once the interface module 10 counts a three byte message, it checks to see if the message is valid (i.e. the message must start with STX and end with ETX). If the message is valid, it is processed as follows: If bit 7 (COMMAND bit) of the Control byte is set (COMMAND=1), the Control byte is transferred to the command register 68 and the state of the interface module 10 is updated accordingly.

The interface module 10 replies with a four byte message which contains the updated status as follows:

STX [Status Register 1] [Status Register 2] ETX (four bytes)

If bit 7 is not set (COMMAND=0), the interface module 10 treats the message as a status poll. The remaining bits in the Control byte are ignored and the interface module 10 replies with the same four byte status message as above.

If the message from the service processor is invalid, i.e. does not begin with STX and end with ETX, the message is treated as a status poll. The Control byte is ignored and the interface module 10 replies with the four byte status message. Also, if the message from the service processor takes longer than 25 ms (time from reception of STX to reception of ETX) to complete, the interface module 10 times out the message and replies with the four byte status message. To avoid a message timeout, the service processor should send the three bytes consecutively (at 9600 baud, this takes approximately 3 ms).

The interface module 10 automatically sends the four byte status message after a reset and whenever a transition occurs on the LNKBTA or LNKBTB status bits. Reset refers to system reset. This means that the service processor has been reset either by powering off/on the shelf of by performing a software controlled reset of the service processor. The reset state of the Control Register is $00H.

In operation, MAU 12 and 14 each scan the transmit lines for the presence of data or a periodic test pulse (link beat) as defined by the 10BaseT standard. Transmit line sanity is indicated in the value of LNKBTA and LNKBTB bits. For example, if LNKBTA is logic low, then the A link is operating properly. Conversely, if LNKBTA is logic high, the A Link is not operating properly.

MAUP and MAUSEL bits define which MAU is primary and which MAU is selected. On power-up, the A link is automatically defined as the primary link. The A link is then selected by the MAUSEL bit to be active by causing relays 36 to transfer AUI signals to MAU A 12. If any part of the primary link fails, the MAUSEL bit is automatically changed and the secondary MAU (if healthy) becomes active without software intervention by causing relays 36 to transfer AUI signals to MAU B 14. After the primary link is repaired, switching back to the primary link depends upon the status of the LNKBTA and LNKBTB bits, and on how the service processor sets the MAUP bit.

For example:

a) Assume that the A link is primary, but has failed and that the B link is active. The service processor is automatically informed of the failed primary link via a message from the interface module. If the A link recovers, the MAUSEL bit is automatically changed to revert back to the A link (because the A link is the primary link). However, if the service processor, under software control, does not want to switch back to the A link, the service processor can change the MAUP bit to select the B link as the primary link.

b) Link selection is as follows: if the primary link (as defined by the MAUP bit) is healthy or if both links have failed, then the primary link is selected. The secondary link is selected only if the primary link has failed and the secondary link is healthy.

c) A healthy link is one in which the MAU for that link is powered up and the link beat is present. For example, for Link A to be deemed healthy, MAU A must be powered up and LINKBTA must be logic low.

Figure 6:
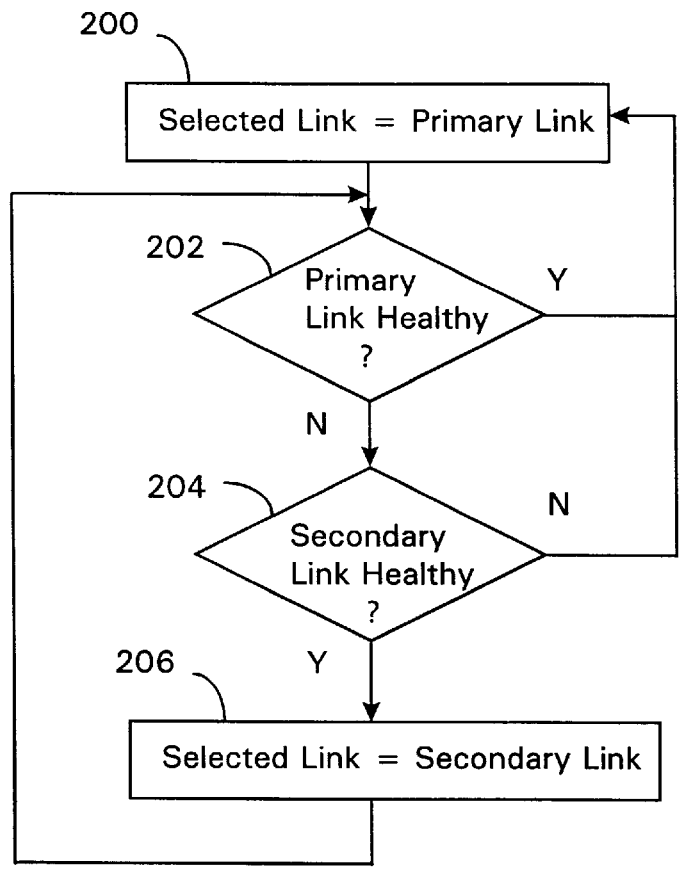
FIG. 6 illustrates in a flowchart the process of link selection of the switching module of FIG. 1.

Referring to FIG. 6, there is illustrated, in a flowchart, the process of link selection, carried out by the MCU 34 of the switching module of FIG. 1. The primary link, indicated by the MAUP bit, is assigned as the selected link in step 200. The selected link is indicated by the MAUSEL bit, which causes the relays 36 to transfer AUI signals 30 to the appropriate MAU. The link status bit of the primary link is checked in step 202 to determine the health of the primary link. If the primary link is healthy, then it remains as the selected link. If the primary link is not healthy, then the link status bit of the secondary link is checked in step 204 to determine the health of the secondary link. If both the primary link and secondary links are not healthy, then the primary link remains as the selected link. However, if the result of step 204 is that the secondary link is healthy, then the secondary link becomes the selected link in step 206. The MCU 34 returns to step 202 in order to repeatedly monitor the health of the links. Any of the above steps could be repeated if the status of the links change or if the service processor changes which link is assigned to the primary link.

Figure 7:
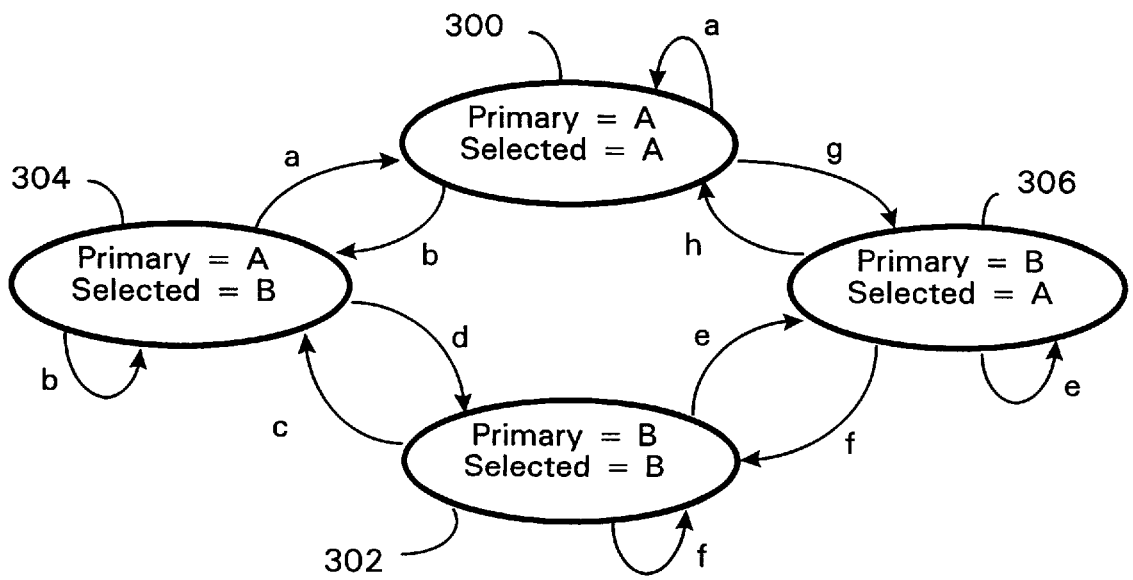
FIG. 7 is a state diagram of the modes of operation of the switching module of FIG. 1.

Referring to FIG. 7 there is illustrated in a state diagram the modes of operation of the switching module of FIG. 1. There are four modes of operation as follows: in the first mode 300, both the primary and secondary links are link A; in the second mode 302, both the primary and secondary links are link B; in the third mode 304, the primary link is link A and the selected link is link B; and in the fourth mode 306 the primary link is link B and the selected is link A. The mode of operation changes from mode to mode according to the transitions labeled a-h in FIG. 7. These transitions depend upon the outcome of the link status checks performed by the MCU 34 in the steps 202 and 204 in FIG. 6, and any changes made by the service processor to the primary link assignment. The transitions are defined as follows:

a: link A is determined to be healthy, or links A and B are determined to be not healthy;
b: link A is determined to be not healthy and link B is determined to be healthy;
c: link A is assigned to be the primary link;
d: link B is assigned to be the primary link;
e: link B is determined to be not healthy and link A is determined to be healthy;
f: link B is determined to be healthy, or links A and B are determined to be not healthy;
g: link B is assigned to be the primary link; and
h: link A is assigned to be the primary link.

The service processor, under software control, can power down or up MAU 12 and 14 independently. The service processor changes the PWRDNx bit to a logic high to power down the desired MAU, or to a logic low to power up the desired MAU. This allows the service processor to override automatic MAU switching and force selection of a particular MAU by powering the other MAU down. For example selection of MAU B is accomplished by powering down MAU A. This feature is useful in a test situation to prevent automatic switching from a failed MAU to a healthy one.

Similarly, the service processor can, under software control, place either MAU in a test mode as defined by TTESTx and SQETTx bits. TTESTx enables (when logic high) the test modes for MAUx. Similarly, SQETTx defines one of two possible test modes: station MAU mode (logic low), and repeater MAU mode (logic high). In station MAU mode, the MAU transfers data independently from the AUI to the LAN link 22. In repeater mode, data from the AUI is looped back onto the AUI, and likewise on the LAN link side. When TTESTx is logic low (test mode disabled), the SQETTx bit must be set low to enable the link beat signal. Thus, normal test operations for each MAU consist of both TTESTx and SQETTX set to logic low.

The RXPOLx status bits indicate polarity reversals, that is wiring errors, on MAUx receive circuitry. A logic high indicates a polarity reversal has been detected by the twisted pair Ethernet transceiver (TPEX). TPEX circuitry automatically compensates for polarity reversals.

Table A provides the pin assignment for the backplane connector for a particular embodiment. Pins 1–18, Row A are for SCSI connections not shown in the figures. Pins 19–24, Row A and pins 23–32, Row C for RS232 connections not shown in the figures. Pins 25–32 Row A are for the RS-232 port 30 of FIGS. 1 and 2. Pins 1–7, Row C are for the AUI bus

TABLE A

| Pin Number | Row A | Row B | Row C |
|---|---|---|---|
| 1. | | | C− |
| 2. | | | C+ |
| 3. | | | T− |
| 4. | | | T+ |
| 5. | | | R− |
| 6. | | | R+ |
| 7. | | | +12VF |
| 25. | TXD4 | | |
| 26. | RXD4 | | |
| 27. | RTS4 | | |
| 28. | TRXC4 not used | | |
| 29. | CTS4 | | |
| 30. | DTR4 | | |
| 31. | DCD4 | | |
| 32. | RTXC4 not used | | |

Table B provides the pin assignment for the LAN connector 22 for a particular embodiment.

TABLE B

| Pin Number | Signal | Output |
|---|---|---|
| 1. | NC | No connection |
| 2. | +ATX | Transmit + (LAN A) |
| 3. | +ARX | Receive + (LAN A) |
| 4. | NC | No connection |
| 5. | +BTX | Transmit + (LAN B) |
| 6. | +BRX | Receive + (LAN B) |
| 7. | NC | No connection |
| 8. | NC | No connection |
| 9. | −ATX | Transmit − (LAN A) |
| 10. | −ARX | Receive − (LAN A) |

TABLE B-continued

| Pin Number | Signal | Output |
|---|---|---|
| 11. | NC | No connection |
| 12. | −BTX | Transmit − (LAN B) |
| 13. | −BRX | Receive − (LAN B) |
| 14. | NC | No connection |
| 15. | NC | No connection |

Numerous modifications, variations and adaptations may be made to the particular embodiments of the invention described above without departing from the scope of the invention, which is defined in the claims.

What is claimed is:

1. A switching module for coupling a processor to a pair of local area network links, comprising:

means for connecting the switching module to the processor;

network interface means for connecting the switching module to the pair of links;

a first media access unit, connected to the network interface means, for coupling the processor to a first link of the pair of links and for monitoring the first link to detect any transmission activity, whereby a link status indication of healthy is generated for the first link when any transmission activity is detected thereon;

a second media access unit, connected to the network interface means, for coupling the processor to a second link of the pair of links and for monitoring the second link to detect any transmission activity, whereby a link status indication of healthy is generated for a second link when any transmission activity is detected thereon;

a plurality of controllable switches for coupling a selected link, which is one of the pair of links, via its respective media access unit to the means for connecting the switching module to the processor; and a controller connected to the plurality of controllable switches having a command register for storing a command from the processor, a first status register for storing an indication of status of the command register and for storing an indication that denotes a primary link, which is one of the pair of links, and a second status register for storing the link status indications and for storing an indication that denotes the selected link; means for choosing the primary link as the selected link when the primary link has a status indication of healthy; means for choosing a secondary link, which is one of the pair of links, as the selected link when the primary link does not have a link status indication of healthy and the secondary link has a link status indication of healthy; means for choosing the primary link as the selected link when both of the primary and secondary links do not have a link status indication of healthy; means for updating, responsive to a command from the processor, the indication denoting the primary link, means for powering down, responsive to a command from the processor, either of the first or second media access units into a test mode of operation; means for forcing, responsive to a command from the processor, either of the first or second media access units into a test mode of operation; means for providing, responsive to a command from the processor, a message containing information from the first and second status registers to the processor; means for providing, responsive to a change in either of the link status indications, the message to the processor; means for providing responsive to a reset of the processor, the message to the processor; means for determining that a command from the processor is invalid; and means for providing, responsive to a determining that a command from the processor is invalid, the message to the processor.

2. A switching module as claimed in claim 1 wherein the second status register comprises means for storing an indication denoting that one of the first or second media access units and its respective link are connected in reverse polarity.

3. A switching module as claimed in claim 1 wherein the means for connecting the switching module to the processor comprises an RS-232 control line, an attachment unit interface line and a connector which receives both of the RS-232 control line and the attachment unit interface line.

4. A switching module as claimed in claim 1 wherein the network interface means for connecting the switching module to the pair of links comprises a local area network connector.

5. A switching module as claimed in claim 1 wherein the first and second media access units comprises a transceiver, a transformer and filter, and an EMI inductor.

6. A switching module as claimed in claim 1, wherein the plurality of controllable switches comprise relays.

7. A switching module as claimed in claim 1 wherein the controller is a microcontroller.

8. A switching module as claimed in claim 1 wherein the transmission activity monitored by the first and second media access units is a 10BaseT link beat signal.

9. A switching module as claimed in claim 1 wherein the means for choosing a respective primary or secondary link comprises computer-executable instructions for performing the steps of:

(a) determining the health of the primary link;

(b) if the primary link is healthy, choosing the primary link as the selected link;

(c) if the primary link is not healthy, determining the health of the secondary link;

(d) if the secondary link is not healthy, choosing the primary link as the selected link; and (e) if the secondary link is healthy, choosing the secondary link as the selected link.

* * * * *